United States Patent
Keister et al.

(10) Patent No.: US 12,175,265 B1
(45) Date of Patent: Dec. 24, 2024

(54) CUSTOMIZING USER INTERFACES BASED ON USER FUNCTION COMPLETION

(71) Applicant: Citibank, N.A., New York, NY (US)

(72) Inventors: Philip Cody Keister, Irving, TX (US); Vaibhav Kumar Gupta, Irving, TX (US); Sandeep Yellambhotla, Irving, TX (US); Geeta Priyanka Janapareddy, Irving, TX (US); Sharika Kanakam, Irving, TX (US); George Higa, Irving, TX (US); Melissa Mathews, Irving, TX (US); Joelle Bove, Irving, TX (US); Aditya Thipireddy, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/622,362

(22) Filed: Mar. 29, 2024

(51) Int. Cl.
*G06F 9/451* (2018.01)

(52) U.S. Cl.
CPC .................................. *G06F 9/451* (2018.02)

(58) Field of Classification Search
CPC ....................................................... G06F 9/451
See application file for complete search history.

(56) References Cited

U.S. PATENT DOCUMENTS

| | | | |
|---|---|---|---|
| 10,025,462 B1* | 7/2018 | Ledet | G06F 40/10 |
| 11,232,436 B1* | 1/2022 | Kelley | G06Q 20/354 |
| 2010/0004959 A1* | 1/2010 | Weingrad | G06Q 10/00 705/5 |
| 2011/0320977 A1* | 12/2011 | Bahn | G06F 3/0488 715/810 |
| 2016/0358259 A1* | 12/2016 | Cucchiara | G06Q 40/06 |
| 2017/0134335 A1* | 5/2017 | Goldstein | H04L 51/02 |
| 2017/0277424 A1* | 9/2017 | Witkowski | G06Q 10/107 |
| 2020/0320894 A1* | 10/2020 | Davidson | G09B 19/00 |
| 2020/0379727 A1* | 12/2020 | Blatz | G06F 9/451 |
| 2022/0391048 A1* | 12/2022 | Scot | G06F 3/0482 |
| 2023/0089574 A1* | 3/2023 | Lunaparra | G06F 40/166 715/255 |
| 2023/0353525 A1* | 11/2023 | Timmons | H04L 51/224 |
| 2023/0360058 A1* | 11/2023 | Lundell | G06Q 10/0633 |

* cited by examiner

*Primary Examiner* — Daniel W Parcher
(74) *Attorney, Agent, or Firm* — Perkins Coie LLP

(57) ABSTRACT

Systems and methods are described herein for novel uses and/or improvements for predicting, using machine learning models, a process for a user based on function execution. An indication of completion of a predetermined application function associated with a user may be detected and a plurality of stored parameters associated with the user may be identified. The predetermined application function and the parameters may be input into a machine learning model to determine/obtain a process prediction for the user. The process may include a number of functions that may be sent to a user device for execution.

19 Claims, 7 Drawing Sheets

| User ID | Device_Type | Stored Parameters | Completed Function |
|---|---|---|---|
| User_1 | Type_1 | Param_1<br>Param_2<br>Param_3 | Function_1 |

300 — 303 User ID, 306 Device_Type, 309 Stored Parameters, 312 Completed Function

FIG. 3

CUSTOMIZING USER INTERFACES BASED ON USER FUNCTION COMPLETION

BACKGROUND

In recent years, the use of artificial intelligence, including, but not limited to, machine learning, deep learning, etc. (referred to collectively herein as artificial intelligence), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Furthermore, user interface development has been an important branch of computer science for many years. Engineers have been developing user interfaces that enable easy performance of functions and processes. In recent years, engineers have been developing interfaces that are more and more flexible, enabling customization of how data is presented to users. Thus, it may be desirable to use artificial intelligence (e.g., machine learning) to modify user interfaces to facilitate better function and process completion.

SUMMARY

Accordingly, systems and methods are described herein for novel uses and/or improvements for predicting, using machine learning models, a process for a user based on function execution. A process prediction system may be used to perform operations for predicting, using machine learning models, a process for a user based on function execution. In many instances, users may be interacting with a user/client device (e.g., a smartphone, an electronic tablet, or another suitable user device). The process prediction system may detect an indication of completion of a predetermined application function which may have been performed by a user. In some embodiments, the predetermined application function may have been detected as the user is interacting with an application on a client device (e.g., on a smartphone or an electronic tablet). For example, the process prediction system may receive user interaction data as a user interacts with an application on a client device. The process prediction system may analyze the user interaction data and determine that the user executed a predetermined function. However, in certain instances, the process prediction system may detect a function execution where a user may call in to a call center and instruct an operator to execute the function on the user's behalf.

The system may then identify a plurality of stored parameters associated with the user. For example, the system may retrieve a history of functions that the user has previously executed and/or processes that the user has previously executed. In some embodiments, the system may retrieve user account information and/or demographic information. The process prediction system may retrieve other suitable parameters.

The process prediction system may then use machine learning to predict a process that the user is performing based on a function and the stored parameters. In particular, the process prediction system may input the predetermined application function and the plurality of stored parameters into a machine learning model to obtain a process identifier for a process that the user is predicted to complete. The machine learning model may have been trained to predict one or more processes based on predetermined application functions and the plurality of stored parameters. For example, execution of a particular function may serve as a starting point for many different processes. Accordingly, when the function is executed, the system may detect the execution of the function and identify a user associated with that function, whether the function was executed by the user or on the user's behalf. The process prediction system may then retrieve user parameters (e.g., as discussed above) and input an identifier of the function and those parameters into a machine learning model. The machine learning model may generate a prediction of a process (e.g., a process identifier) that the user is likely executing. The process may include a number of functions in addition to the function already executed by the user.

The process prediction system may then retrieve, based on the process identifier, a set of application functions associated with the process. For example, the application functions may be required/desired to finish the process that the user has started. In some embodiments, the functions may be available to the user, but are not easily accessible without searching for interface elements associated with those functions. Accordingly, the process prediction system may generate a customized user interface based on the set of application functions. The customized user interface may indicate, to the user, the process to perform and one or more application functions within the set of application functions to perform. In some embodiments, the customized user interface may be different based on a client device a user is using. For example, for a smartphone or a tablet, the customized user interface may instruct the system to display tiles for the different functions within the process. In another example, the customized user interface may instruct the system to generate a display that includes a selectable listing of the functions within the set of functions.

The process prediction system may then transmit, to a client device, a request to update a current user interface with the customized user interface. The request may include the process identifier and one or more application function identifiers for one or more application functions of the set of application functions. For example, the process prediction system may select, for the set of application functions, a set of interface elements. In some embodiments, each application function may be associated with various interface elements (e.g., selected based on device type or another suitable criterion). Thus, the system may select a user interface element for each application function. The system may then input the interface data and the set of user interface parameters into an interface generation model to obtain updated interface data. The interface generation model may be one that has been trained to generate the updated interface data. Once the updated interface data is generated, the system may then generate the customized user interface based on the updated interface data.

In some embodiments, the predetermined application function may be performed by a third party (e.g., an agent). Thus, a user may contact the third party over a voice communication device or a text communication device (e.g., text message, messenger service, etc.) and request that the third party perform the predetermined application function. Based on the third party performing the predetermined application function, the process prediction system may transmit the set of functions to perform to the computing device of the third party and cause the computing device to generate a display interface for executing those functions. Furthermore, the process prediction system may identify other application functions for the user to perform and may add those to the interface for the third party for requesting permission of the user to perform those additional functions and/or the functions associated with the predicted process.

In some embodiments, the set of functions associated with the predicted process may be required to be executed in order. Thus, the process prediction system may generate for display function identifiers (e.g., tiles) that indicate an order. For example, larger tiles may indicate that those functions may be required to be performed first. In some embodiments, tiles that are of the same size may indicate that those functions may be performed in any order and/or in parallel.

In some embodiments, the machine learning model may not be able to predict a single process for the user and may output multiple possible processes. Based on that, the process prediction system may identify functions common to both of those processes. The process prediction system may also identify functions that are not common. Thus, the process prediction system may generate for display indicators of two or more functions that correspond to different processes. Based on the function that the user selects, the process prediction system may select the corresponding process. Furthermore, the process prediction system may retrain the machine learning model based on the selection of the user.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates a possible input data structure into a machine learning model, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
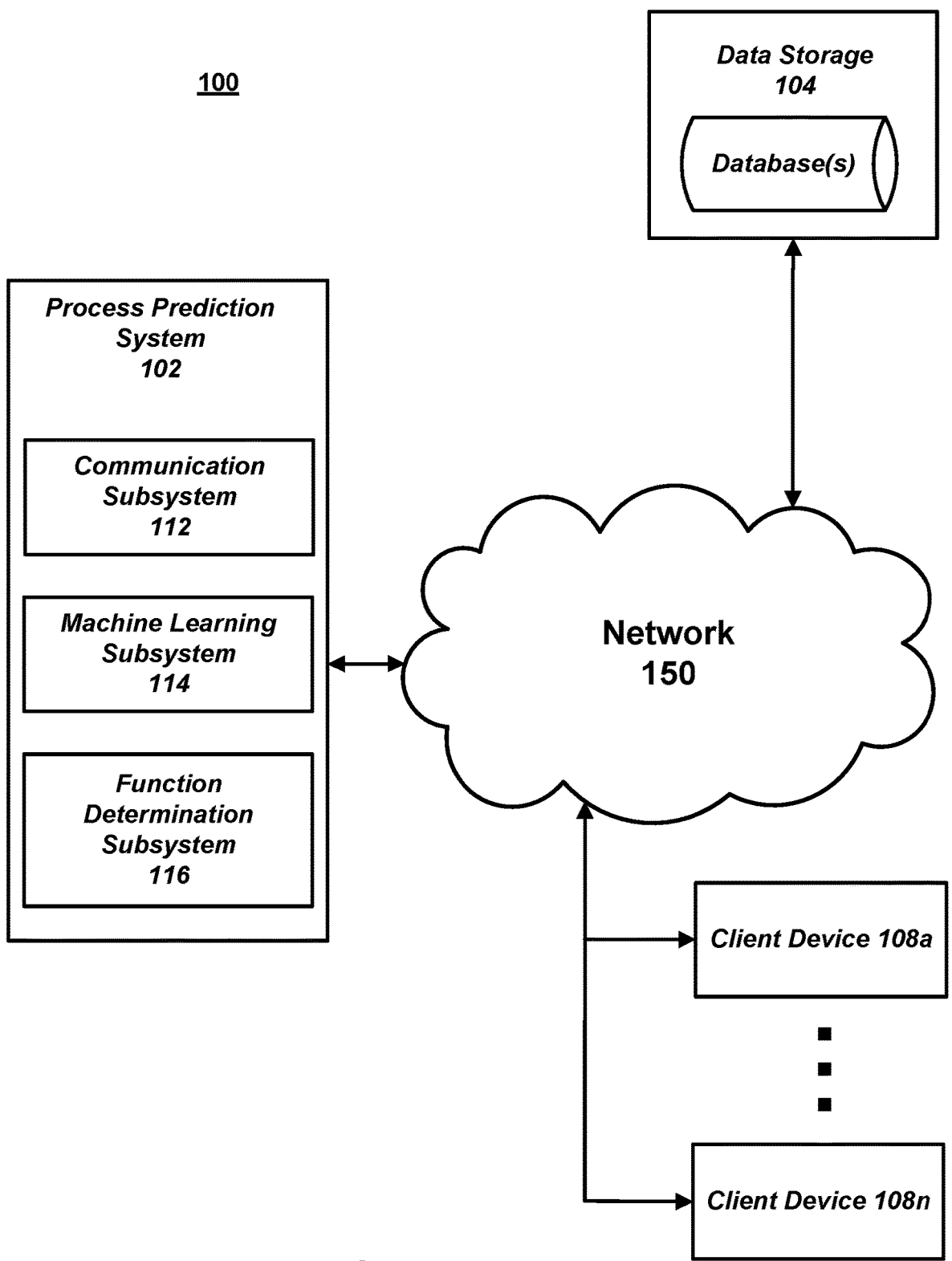
FIG. 1 shows an illustrative system for predicting, using machine learning models, a process for a user based on function execution, in accordance with one or more embodiments.

FIG. 1 is an example of an environment 100 for predicting, using machine learning models, a process for a user based on function execution. Environment 100 includes process prediction system 102, data storage 104, and client devices 108a-108n. Process prediction system 102 may execute instructions for predicting, using machine learning models, a process for a user based on function execution. Process prediction system 102 may include software, hardware, or a combination of the two. For example, process prediction system 102 may reside on a physical server or a virtual server that is running on a physical computer system. In some embodiments, process prediction system 102 may be configured on a user device (e.g., a laptop computer, a smartphone, a desktop computer, an electronic tablet, or another suitable user device).

Data storage 104 may store various data, including one or more machine learning models, training data, function tables, process tables, function to process relationships, and/or other suitable data. Data storage 104 may include a combination of hardware (e.g., memory and/or disk) and software (e.g., for reading/writing data to the hardware). Network 150 may be a local area network (LAN), a wide area network (WAN) (e.g., the internet), or a combination of the two. Client devices 108a-108n may be end-user computing devices (e.g., desktop computers, laptops, electronic tablets, smartphones, and/or other computing devices used by end users). In some embodiments, client devices may be devices associated with a user. However, one or more client devices may be associated with a third party (e.g., a customer service agent).

In some embodiments, process prediction system 102 may receive application data associated with a user of an application. As referred to herein, the term "application" may refer to a program being executed on a client device. As referred to herein, the term "application data" should be understood to mean an electronically consumable data (e.g., consumed by the user), such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. In some embodiments, process prediction system 102 may receive the application data via communication subsystem 112. Communication subsystem 112 may include software components, hardware components, or a combination of both. For example, communication subsystem 112 may include software that is enabled to communicate via a network (e.g., network 150).

In some embodiments, communication subsystem 112 may receive the application data from a client device (e.g., a device associated with a user). In particular, communication subsystem 112 may receive, at a server from a client device, user interaction data as a user interacts with an application on the client device. For example, a user may be interacting with a banking application and perform various functions within the banking application. Communication subsystem 112 may receive the interaction data from the banking application. In some embodiments, a third party (e.g., a customer service agent) may be interacting with a banking application instead of the user (e.g., based on a request of the user). For example, a user may call in to a customer service center and request that a customer service agent perform an application function for the user.

Figure 2:
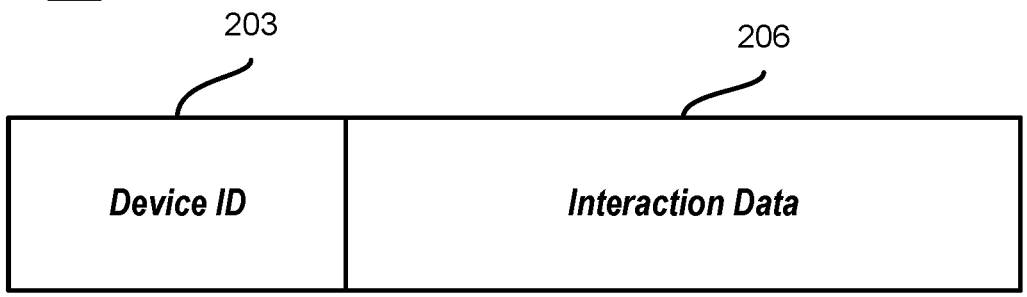
FIG. 2 illustrates excerpts of data structures for process prediction, in accordance with one or more embodiments.

FIG. 2 illustrates a data structure 200 for storing and communicating interaction data. Field 203 may store a device identifier associated with a device where the interaction data originated, while field 206 may store the interaction data itself. A client device (e.g., of client devices 108a-108n) may transmit the interaction data together with the device identifier of the transmitting device to process prediction system 102. In some embodiments, the client device may be associated with a third party (e.g., a customer service agent). Accordingly, process prediction system 102 may determine that the device identifier is not associated with the user and may determine a user identifier associated with the interaction data.

Communication subsystem 112 may pass the interaction data, or a pointer to the interaction data in memory, to machine learning subsystem 114. Machine learning subsystem 114 may include software components, hardware components, or a combination of both. For example, machine learning subsystem 114 may include software components (e.g., application programming interface (API) calls) that access one or more machine learning models. Machine learning subsystem 114 may detect, within the user interaction data, an indication of completion of a predetermined application function. For example, machine learning subsystem 114 may identify a plurality of functions within the interaction data and determine whether any of those functions correspond to a predetermined application function.

In some embodiments, communication subsystem 112 may receive function completion data without depending on interaction data from a client device. For example, when users or third parties on behalf of the users (e.g., customer service agents on behalf of customers) perform application functions, those application functions may be stored in a data structure (e.g., a database or a database table). Process prediction system 102 may access that data structure and retrieve the function completion data. For example, data storage 104 may store function completion data together with other data (e.g., machine learning models and corresponding data). The function completion data may be pushed to data storage 104 when functions are completed or may be periodically pulled by data storage 104. Thus, machine learning subsystem 114 may detect an indication of completion of a predetermined application function. The predetermined application function may be associated with a particular user (e.g., executed against an account of the user). In some embodiments, the predetermined application function may be executed by the user or by a third party on behalf of the user.

Data structure 220 of FIG. 2 illustrates a data structure that stores various executed application functions and corresponding data. For example, as users or third parties (e.g., customer service agents) interact with a particular application, process prediction system 102 may keep track of those interactions and store them in a data structure, such as data structure 220. Field 223 stores a function identifier. For example, for a financial application, a function may be a deactivation of a credit card or a debit card. Field 226 stores a user identifier associated with the application function that was executed, and field 229 may store a device identifier associated with the execution of the application function. For example, the device identifier may indicate whether the user is executing application functions or whether a third party (e.g., a customer service agent) is executing the application functions.

One example of an application function that may be executed is locking a credit card or a debit card. When a customer takes that action, it is generally unclear why the card was locked. For example, a customer may have locked their card because the customer left the card at a restaurant and may retrieve the card soon. Thus, the only function that may need to be completed by the customer is to temporarily turn on fraud monitoring in relation to the customer's account. No other actions may be necessary. However, if the customer locked their card because the customer lost their card, other functions may need to be executed by the customer (e.g., canceling the card, ordering a new card, etc.). In another example, the customer might have locked their card because they do not plan to use it for a long time and if the card is lost, the customer did not want to incur any charges, thus no functions need to be executed for the customer.

Another example of using the disclosed system may be unrelated to banking applications. That is, a user may be planning a vacation and may purchase a plane ticket for traveling to a particular location and traveling back. Thus, the system may be used to recommend other processes to perform based on the airplane ticket purchased. Those may include recommendations to apply for various visas, recommendations of hotels, etc. Those recommendations may be predicted in different manners and may have different functions based on the destination for which the airplane ticket was purchased.

In some embodiments, machine learning subsystem 114 may determine whether any executed application function is a predetermined application function that may be associated with a particular process or multiple processes. For example, machine learning subsystem 114 may store a list of predetermined application functions. When process prediction system 102 receives indications of executed application functions (e.g., as shown in data structure 200), machine learning subsystem 114 may compare the received executed application functions with stored predetermined application functions. In some embodiments, machine learning subsystem 114 may compare function identifiers. Thus, when a received executed application function matches a predetermined application function, machine learning subsystem 114 may determine that a predetermined application function has been completed. To continue with the examples above, machine learning subsystem 114 may determine that locking a credit card or a debit card is a predetermined application function. Furthermore, machine learning subsystem 114 may determine that buying an airplane ticket may be a predetermined application function.

When execution of a predetermined application function has been detected, machine learning subsystem 114 may collect user data used to predict a process that the user is attempting to perform. In particular, machine learning subsystem 114 may identify a plurality of stored parameters associated with the user. The parameters may be stored in, for example, a database in data storage 104. The user parameters may include user history of function execution and/or process execution, user demographics, and/or other suitable parameters. In some embodiments, such as financial embodiments, machine learning subsystem 114 may retrieve the user's transaction history and use that transaction history as a portion of the stored parameters. In some embodiments, machine learning subsystem 114 may determine a device type associated with the user's device on which the user performed the predetermined application function and may use the device type as one of the parameters to be used by the machine learning model.

Machine learning subsystem 114 may generate a data structure for providing an input to a machine learning model. Data structure 300 of FIG. 3 illustrates such a data structure. Field 303 stores a user identifier. Field 306 may store a device type. In some embodiments, data structure 300 may not include field 306 as device type may not be one of the parameters. Field 309 may store stored parameters. As discussed above, the stored parameters may include application function execution data, user demographics, financial transaction history, and/or other suitable data. Field 312 stores the predetermined application function that was completed and that triggered the processing. Accordingly, data structure 300 may be used as input into a machine learning model.

The machine learning model may then be used to predict a process that the user is attempting to execute based on the predetermined application function that was completed. In particular, machine learning subsystem 114 may input the predetermined application function and the plurality of stored parameters into a machine learning model to obtain a process identifier for a process that the user is predicted to complete. The machine learning model may be one that has been trained to predict one or more processes based on predetermined application functions and the plurality of stored parameters.

In some embodiments, machine learning subsystem 114 may take into account a device type when obtaining the process identifier. In particular, machine learning subsystem 114 may determine a device type associated with a client device which executed the predetermined application function. For example, the device type may be a smartphone, an electronic tablet, a laptop computer, a desktop computer, or another suitable device type. Machine learning subsystem 114 may then input the device type into the machine learning model for obtaining the process identifier. The device type may help the machine learning model identify the process. For example, a user may use a smartphone to lock the card. This may indicate that the user has lost the card recently. The machine learning model may use that data in the determination of the process. In addition to a device type, machine learning subsystem 114 may use location of where the function took place, time of day, and/or other environmental factors.

Figure 4:
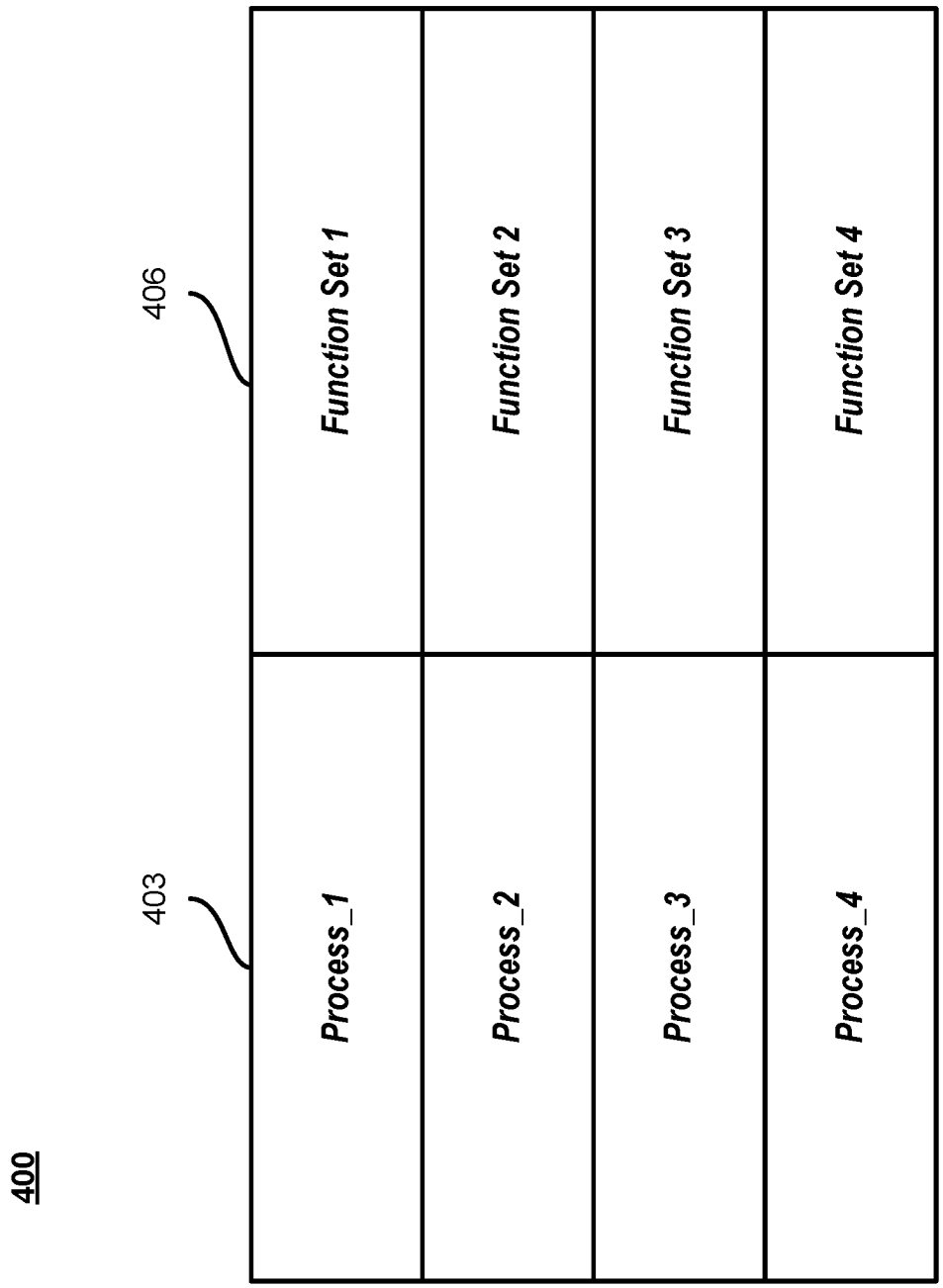
FIG. 4 illustrates an excerpt of an example data structure storing a process identifier and corresponding functions, in accordance with one or more embodiments.

In some embodiments, the output of the machine learning model may be one or more identifiers of processes predicted by the machine learning model. The one or more process identifiers may be used to determine subsequent functions to be executed by the user or the third party to complete the predicted process. For example, machine learning subsystem 114 may use a lookup data structure (e.g., a table) to perform the determination. FIG. 4 illustrates an excerpt of a data structure 400 that stores processes. Field 403 stores the process identifier and field 406 stores the function set for each process. Each function set may store one or more function identifiers for application functions to be executed. Once the machine learning model outputs one or more process identifiers, machine learning subsystem 114 may determine the other application functions to be completed. As discussed above, the machine learning model may be a trained model such as a neural network or another suitable machine learning model.

Figure 5:
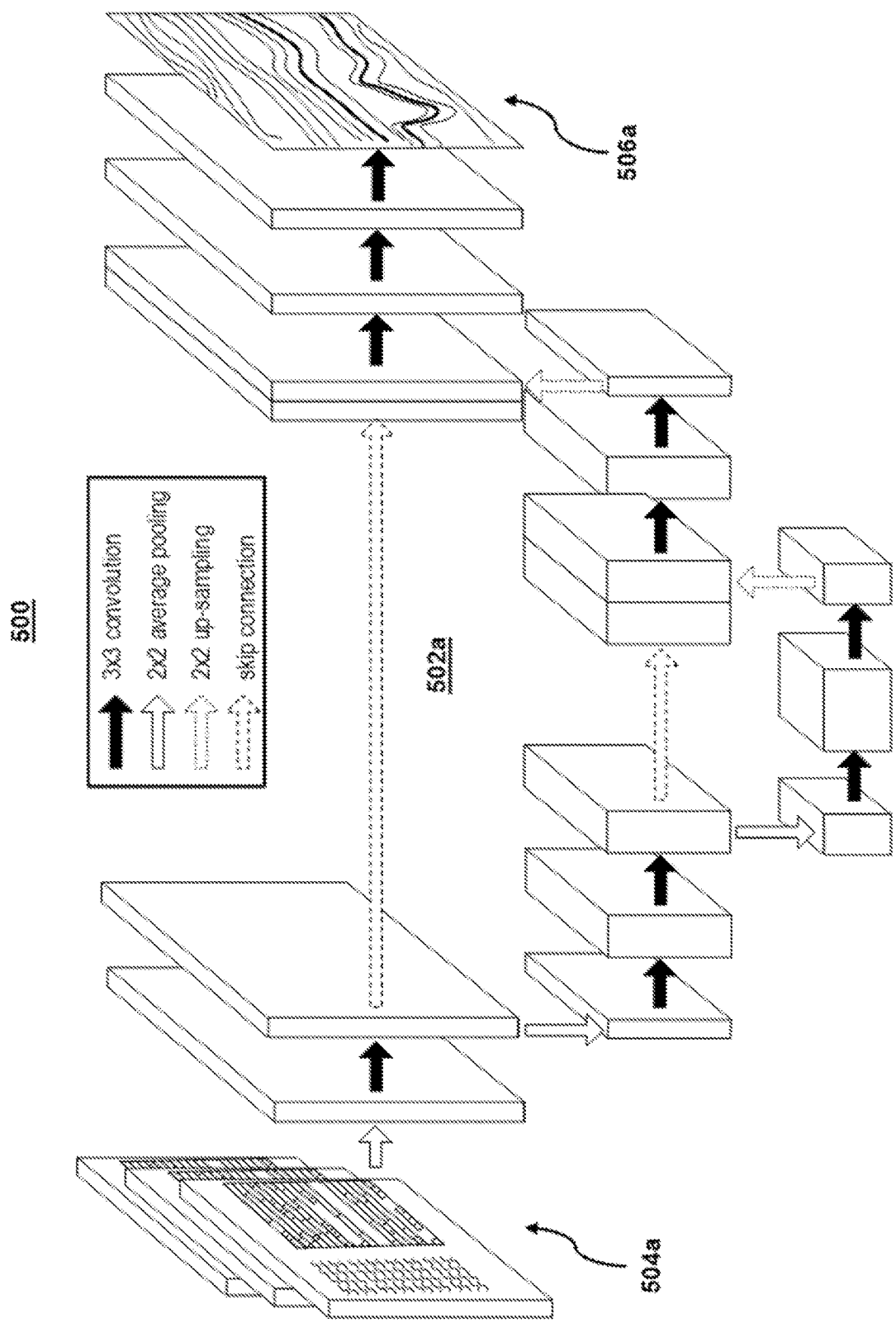
FIG. 5 shows illustrative components for a machine learning model used for predicting a process for a user based on function execution, in accordance with one or more embodiments.

FIG. 5 shows illustrative components for a machine learning model used for predicting a process for a user based on function execution. System 500 includes model 502*a*, which may be a machine learning model, an artificial intelligence model, etc. (which may be referred to collectively as "models" herein). Model 502*a* may take inputs 504*a* and provide outputs 506*a*. The inputs may include multiple datasets, such as a training dataset and a test dataset during training and an application function with stored parameters during usage. Each of the plurality of datasets (e.g., inputs 504*a*) may include data subsets related to user data, predicted forecasts and/or errors, and/or actual forecasts and/or errors. In some embodiments, outputs 506*a* may be fed back to model 502*a* as input to train model 502*a* (e.g., alone or in conjunction with user indications of the accuracy of outputs 506*a*, labels associated with the inputs, or other reference feedback information). For example, the system may receive a first labeled feature input, such that the first labeled feature input is labeled with a known prediction for the first labeled feature input. The system may then train the first machine learning model to classify the first labeled feature input with the known prediction.

In a variety of embodiments, model 502*a* may update its configurations (e.g., weights, biases, or other parameters) based on the assessment of its prediction (e.g., outputs 506*a*) and reference feedback information (e.g., user indication of accuracy, reference labels, or other information). In a variety of embodiments, where model 502*a* is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 502*a* may be trained to generate better predictions.

In some embodiments, the model (e.g., model 502*a*) may automatically perform actions based on outputs 506*a*. In some embodiments, the model (e.g., model 502*a*) may not perform any actions. The output of the model (e.g., model 502*a*) may be used to output one or more process identifiers. That is, a generic model 502*a* may be trained to predict one or more processes for the user by outputting one or more process identifiers.

In some embodiments, process prediction system 102 may train the machine learning model using a training dataset. In particular, process prediction system 102 may receive a training dataset formed using a plurality of entries and a plurality of features. The training dataset may further include user history related to function execution. For example, user history may be stored as a data structure indicating a function identifier for an application function that the user executed, the time when a particular application function was executed, and other suitable data. Furthermore, the training dataset may include a target training feature that indicates a corresponding process followed by the user. Process prediction system 102 may then input the training dataset into a training routine of the machine learning model to train the machine learning model based on the feature values within the training dataset. For example, features may include function identifiers, execution times, and other suitable features.

In some embodiments, the training dataset may include user demographic information, device types of devices used by the user, and other data. In particular, the training dataset may store features (e.g., columns) for each user that store demographic data associated with each user (e.g., each entry). As discussed above, the machine learning model may be trained using both the user history related to the function execution and the demographic data of each corresponding user.

In some embodiments, process prediction system 102 may build or update a training dataset based on application function execution by one or more users. In particular, process prediction system 102 may retrieve user history for each user associated with the training dataset. The user history may be application function execution history. The application function execution history may be for the particular application where the predetermined application function was executed.

In some embodiments, process prediction system 102 may use the user history to determine various processes that the user within the training dataset completed. In particular, process prediction system 102 may identify, for each user and based on function history and order of completion, corresponding one or more processes performed by each user. For example, process prediction system 102 may store (e.g., in data storage 104) user history as it pertains to the functions that the user has executed. In addition, process prediction system 102 may store (e.g., in data storage 104) a listing of various processes and application functions associated with each process. Process prediction system 102 may compare the user history of each user with application functions within each process and determine which process or processes each user within the training dataset has executed. Based on that data, process prediction system 102 may update the training dataset with the corresponding one or more processes as a target feature for training the machine learning model. That is, process prediction system 102 may generate a target feature for the dataset using this process.

In some embodiments, when machine learning subsystem 114 receives from the machine learning model a prediction of multiple processes that are predicted for the user, machine learning subsystem 114 may narrow down the multiple processes to a single process. In some embodiments, machine learning subsystem 114 may make the determination based on a probability associated with each predicted process. For example, if machine learning subsystem 114 receives from the machine learning model a first process having a probability of 80% and a second process having a probability of 40%, machine learning subsystem 114 may select the first process. In some embodiments, machine learning subsystem 114 may ask the user for help in identifying the correct process. In particular, machine learning subsystem 114 may receive from the machine learning model a plurality of process identifiers for a plurality of processes that the user is predicted to complete. For example, machine learning subsystem 114 may receive two different processes that are predicted for the user.

When machine learning subsystem 114 receives the multiple process identifiers, machine learning subsystem 114 may determine the functions associated with each process and identify, for the plurality of processes, one or more common functions. For example, each process may include four different functions with two of the functions being the same and the other two functions being different. Thus, machine learning subsystem 114 may identify those functions that are the same (common) and those functions that are different (non-common). Thus, based on non-common functions, machine learning subsystem 114 may determine which process the user is predicted to initiate.

To get the user input, machine learning subsystem 114 may cause a display of the non-common functions for the user to select. In particular, machine learning subsystem 114 may generate for display, for each process of the plurality of processes, a plurality of selectable indications each associated with a corresponding non-common function. For example, machine learning subsystem 114 may generate a display that includes two functions: one function corresponding to a first predicted process and the other function corresponding to a second predicted process. When the user selects a particular function (e.g., corresponding to the first predicted process or the second predicted process), machine learning subsystem 114 may identify the corresponding process. In some embodiments, machine learning subsystem 114 may use the selection to train the machine learning model. In particular, machine learning subsystem 114 may train the machine learning model based on a selection of a non-common function. For example, machine learning subsystem 114 may initiate a training routine of the machine learning model. The training routine may be initiated from data storage 104 or on the same device as process prediction system 102.

As discussed above, machine learning subsystem 114 may receive a process identifier for a process that is predicted by the machine learning model. In some embodiments (e.g., where multiple process identifiers are received), machine learning subsystem 114 may narrow the multiple processes to a single process (e.g., as discussed above). Machine learning subsystem 114 may then pass the process identifier associated with the process or a pointer to the process identifier in memory to function determination subsystem 116. Function determination subsystem 116 may include software components, hardware components, or a combination of both. For example, function determination subsystem 116 may include software components that identify process functions and generate customized interfaces. To continue with the example above, function determination subsystem 116 may receive, from the machine learning model, a process identifier indicating that the customer locked their card because the card was lost or stolen (e.g., the card must be canceled and replaced).

Function determination subsystem 116 may retrieve, based on the process identifier, a set of application functions associated with the process. For example, function determination subsystem 116 may perform a table lookup for a particular process using a process identifier. The table may store process identifiers and corresponding data associated with the process. For example, the table may include functions such as cancel card, order a new card, monitor for fraudulent activities, etc. Those application functions may be retrieved so that the user (or a third party) may execute those functions. In some embodiments, those functions may be executed automatically upon approval from the user (e.g., to prevent execution of functions when the machine learning model made a mistake in the prediction).

When function determination subsystem 116 identifies and retrieves the correct functions, function determination subsystem 116 may cause a user device to display those functions for the user to execute. In particular, function determination subsystem 116 may transmit, to a computing device, the process identifier and one or more application function identifiers for one or more application functions of the set of application functions. For example, function determination subsystem 116 may transmit an identifier of the process and the functions for that process to the client device so that the client device is able to display the functions to the user to execute. In some embodiments, the functions may be a link to a card cancellation process and another link to a new card order process.

In some embodiments, a third party (e.g., a customer service agent) may have been called on to execute the original function, thus, function determination subsystem 116 may transmit the functions to the third party's terminal for execution. In particular, function determination subsystem 116 may determine that the predetermined application function was performed for the user by a third party. For example, function determination subsystem 116 may determine that the function was performed by a customer service agent. Function determination subsystem 116 may make the determination based on a device identifier from which the function was executed. In some embodiments, function determination subsystem 116 may make the determination based on a user identifier that performs the operation. For example, if the user identifier corresponds to a customer service agent, function determination subsystem 116 may determine that the function has been performed by a third party.

Based on the determination, function determination subsystem 116 may ask permission from the user for the third party to perform the functions associated with the identified process. Thus, function determination subsystem 116 may transmit to a device associated with the user a permissions request for the third party to perform the set of application functions. For example, a user may call a financial institution and get on the phone with a customer service agent. The customer may then request, from the customer service agent, that the customer service agent lock the user's card. Based on that action, machine learning subsystem 114 may receive, based on the user interaction data and the function executed, a prediction that the process the customer desires to perform is to cancel and replace the card because the card may have been lost or stolen. Based on that determination, the third party (e.g., the customer service agent) may need a permission from the user to perform those functions. Thus, function determination subsystem 116 may transmit a request to a device associated with the user (e.g., a previously registered device executing a bank application).

Function determination subsystem 116 may then receive a permission from the user's device to perform the operation. In response to receiving permission, from the user, to perform the set of application functions by the third party, function determination subsystem 116 may generate a customized user interface on the computing device of the third party for performing the set of application functions. For example, function determination subsystem 116 may generate selectable icons on the third party's device to execute the set of functions. Furthermore, function determination subsystem 116 may transmit a notification to a client device indicating that the third party is performing one or more functions of the set of application functions. The notification may include the set of functions shown to the third party. In some embodiments, function determination subsystem 116 may monitor function execution by the third party and notify the user device as each function is completed.

In some embodiments, process prediction system 102 may store a record of the third party executing the predetermined function. Thus, process prediction system 102 may detect the indication of completion of the predetermined application function using the following operations. Process prediction system 102 may receive the indication of completion from a third party. The indication may include an identifier associated with the user and a party identifier associated with the third party. Process prediction system 102 may then update a record associated with the user with the set of application functions. The record may be associated with a permission to be accessed by the third party. For example, process prediction system 102 may monitor a data structure associated with the user for a predetermined function execution. The data structure may be a database on data storage 104. When the data structure is updated (e.g., a function is input into the data structure), whether by the user from a user device or by a third party from a third-party device, process prediction system 102 may identify the change and determine whether a predetermined function has been executed.

In some embodiments, function determination subsystem 116 may generate a customized user interface for the user or for the third party to execute the set of functions. In particular, function determination subsystem 116 may generate a customized user interface based on the set of application functions. The customized user interface may indicate, to the user, the process to perform and the one or more application functions within the set of application functions to perform. For example, function determination subsystem 116 may generate a user interface that includes a number of selectable icons or tiles corresponding to the set of functions for the user to execute. In some embodiments, the user interface may include a plurality of tiles that are positions on the display in a particular configuration (e.g., based on the order of the functions).

In some embodiments, function determination subsystem 116 may use an interface generation model (e.g., a large language model) for generating a customized user interface. In particular, function determination subsystem 116 may select, for the set of application functions, a set of interface elements. For example, function determination subsystem 116 may select a tile for each function in the set of functions. A first tile may represent a function of canceling the card, while a second tile may represent a function of ordering a new replacement card. When the user selects each tile, execution of the corresponding function is initiated. Function determination subsystem 116 may then input the set of interface elements into an interface generation model to obtain the customized user interface. The interface generation model may be trained to generate customized user interfaces based on element sets.

In some embodiments, function determination subsystem 116 may identify other functions that may be recommended for the user (e.g., based on best practices). In particular, function determination subsystem 116 may identify, based on the process, one or more additional functions that are related to the process. The one or more additional functions may improve function execution or the result of function execution. Function determination subsystem 116 may then generate one or more indications of the one or more additional functions. For example, function determination subsystem 116 may determine that in addition to canceling the card and requesting a new replacement card, it may be prudent for the user to change the user's password to the banking application or a card's personal identification number (PIN). Accordingly, function determination subsystem 116 may add an interface element (e.g., a tile) for that function. In some embodiments, the function may be differentiated from other functions as an optional function.

When function determination subsystem 116 generates a customized user interface, function determination subsystem 116 may transmit the interface to a user device or third-party device (e.g., when a customer service agent is performing the functions). In particular, function determination subsystem 116 may transmit, to the client device, a request to update a current user interface with the customized user interface. The request may include the process identifier and one or more application function identifiers for the one or more application functions. As discussed above, function determination subsystem 116 may cause the user/ client device to generate the customized user interface (e.g., the customized user interface having tiles corresponding to the set of functions).

In some embodiments, function determination subsystem 116 may generate an order to the customized user interface based on the set of functions. In particular, function determination subsystem 116 may determine an order of processes associated with the set of application functions. The order may include two or more application functions that are enabled to be executed in parallel. For example, the functions for canceling a current card and ordering a new replacement card may be executed in parallel. However, the function of generating a new PIN code for the replacement card may not be initiated before the new card is ordered. Function determination subsystem 116 may then generate a plurality of user interface display tiles of different sizes based on the order of processes. Two or more tiles that are associated with the two or more application functions that are enabled to be executed in parallel may be displayed in a same size. Those functions that are not enabled to be executed in parallel may be displayed in smaller-sized tiles or may be grayed out until a dependent function has been executed.

Figure 6:
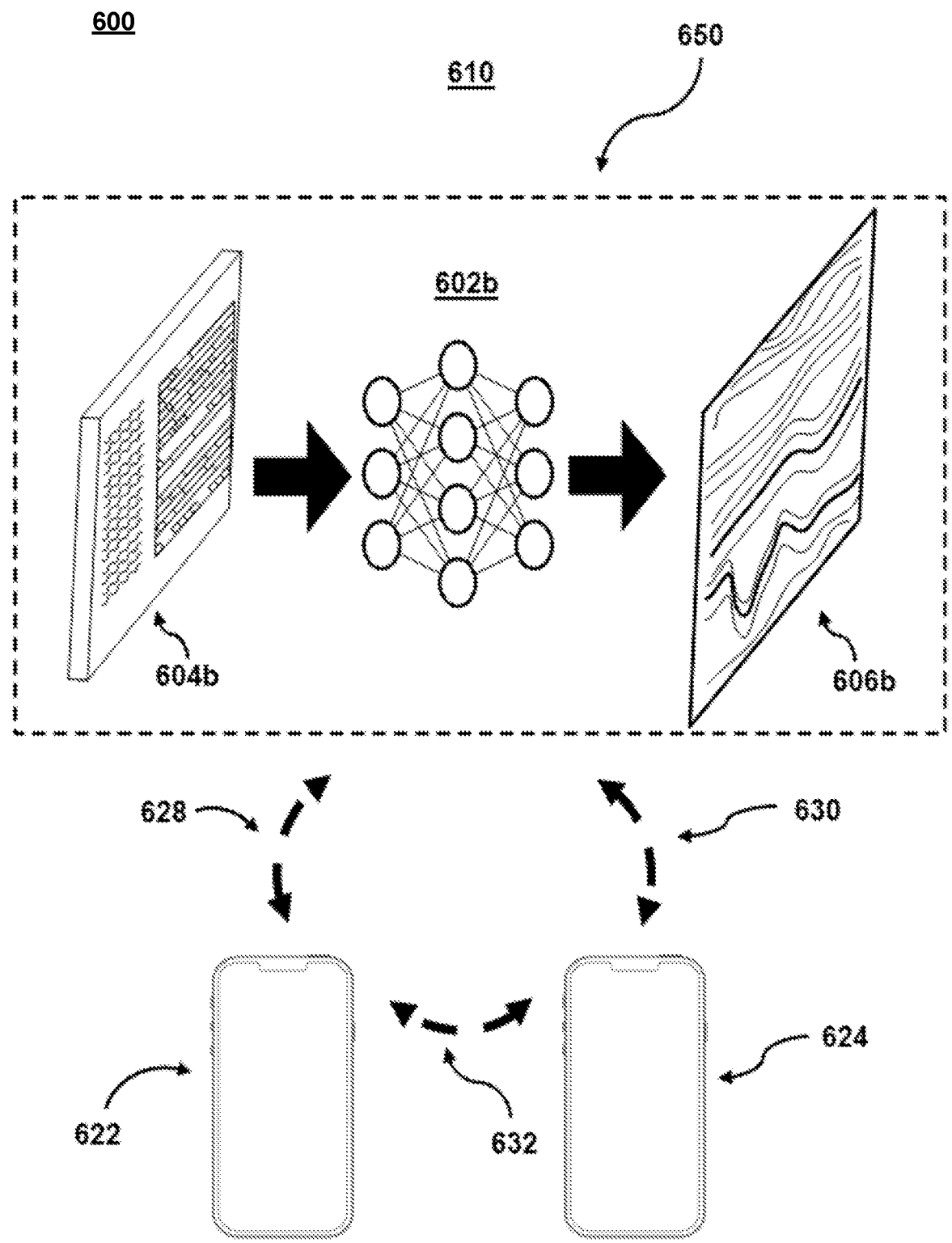
FIG. 6 shows illustrative components for a system used for predicting, using machine learning models, a process for a user based on function execution, in accordance with one or more embodiments.

FIG. 6 illustrates a possible environment in which process prediction system 102 may be installed and executed. As shown in FIG. 6, the system 600 may include mobile device 622 and mobile device 624 (e.g., representing client/user devices described above). While shown as smartphones in FIG. 6, it should be noted that mobile device 622 and mobile device 624 may be any computing device, including, but not limited to, a laptop computer, a tablet computer, a handheld computer, and other computer equipment (e.g., a server), including "smart," wireless, wearable, and/or mobile devices. System 600 may also include cloud components 610. For example, cloud components may be implemented as a cloud computing system and may feature one or more component devices. It should be noted that, while one or more operations are described herein as being performed by particular components of system 600, these operations may, in some embodiments, be performed by other components of system 600. As an example, while one or more operations are described herein as being performed by components of mobile device 622, these operations may, in some embodiments, be performed by cloud components. In some embodiments, the various computers and systems described herein may include one or more computing devices that are programmed to perform the described functions. Additionally, or alternatively, multiple users may interact with system 600 and/or one or more components of system 600.

With respect to the components of mobile device 622 and mobile device 624, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 6, both mobile device 622 and mobile device 624 include a display upon which to display data.

Additionally, as mobile device 622 and mobile device 624 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 600 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 6 also includes communication paths 628, 630, and 632. Communication paths 628, 630, and 632 may include the internet, a mobile phone network, a mobile voice or data network (e.g., a 5G or LTE network), a cable network, a public switched telephone network, or other types of communications networks or combinations of communications networks. Communication paths 628, 630, and 632 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 600 also includes API layer 650. API layer 650 may allow the system to execute functions/operations across devices or internally. In some embodiments, API layer 650 may be implemented on mobile device 622 or mobile device 624. Alternatively or additionally, API layer 650 may reside on one or more of cloud components 610. API layer 650 (which may be a REST or Web services API layer) may provide a decoupled interface to data and/or functionality of one or more applications. API layer 650 may provide a common, language-agnostic way of interacting with an application. Web services APIs offer a well-defined contract called WSDL that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 650 may use various architectural arrangements. For example, system 600 may be partially based on API layer 650, such that there is strong adoption of SOAP and RESTful Web services, using resources like Service Repository and Developer Portal, but with low governance, standardization, and separation of concerns. Alternatively, system 600 may be fully based on API layer 650, such that separation of concerns between layers like API layer 650, services, and applications are in place.

In some embodiments, the system architecture may use a microservice approach. Such systems may use two types of layers: Front-End Layer and Back-End Layer where microservices reside. In this kind of architecture, the role of the API layer 650 may provide integration between Front-End and Back-End. In such cases, API layer 650 may use RESTful APIs (exposition to front-end or even communication between microservices). API layer 650 may use AMQP (e.g., Kafka, RabbitMQ, etc.). API layer 650 may use incipient usage of new communications protocols such as gRPC, Thrift, etc.

In some embodiments, the system architecture may use an open API approach. In such cases, API layer 650 may use commercial or open-source API platforms and their modules. API layer 650 may use a developer portal. API layer 650 may use strong security constraints applying WAF and DDOS protection, and API layer 650 may use RESTful APIs as standard for external integration.

As shown in FIG. 6, in some embodiments, model 602b may be trained by taking inputs 604b and providing outputs 606b. Model 602b may correspond to the machine learning model of FIG. 5. This model may represent the machine learning model described above. Furthermore, this model may represent the large language model described above. Model 602b may include an artificial neural network. In such embodiments, model 602b may include an input layer and one or more hidden layers. Each neural unit of model 602b may be connected with many other neural units of model 602b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602b may be self-learning and trained, rather than explicitly programmed, and can perform significantly better in certain areas of problem solving as compared to traditional computer programs. During training, an output layer of model 602b may correspond to a classification of model 602b, and an input known to correspond to that classification may be input into an input layer of model 602b during training. During testing, an input without a known classification may be input into the input layer, and a determined classification may be output.

In some embodiments, model 602b may include multiple layers (e.g., where a signal path traverses from front layers to back layers). In some embodiments, backpropagation techniques may be utilized by model 602b where forward stimulation is used to reset weights on the "front" neural units. In some embodiments, stimulation and inhibition for model 602b may be more free-flowing, with connections interacting in a more chaotic and complex fashion. During testing, an output layer of model 602b may indicate whether or not a given input corresponds to a classification of model 602b.

Model 602b is shown as a convolutional neural network. A convolutional neural network consists of an input layer (e.g., input 604b), hidden layers, and an output layer (e.g., output 606b). As shown in FIG. 6, the middle layers are called hidden because their inputs and outputs are masked by the activation function and final convolution. In a convolutional neural network, the hidden layers include layers that perform convolutions. Model 602b may comprise convolutional layers that convolve the input and pass its result to the next layer. Model 602b includes local and/or global pooling layers along with traditional convolutional layers. Pooling layers reduce the dimensions of data by combining the outputs of neuron clusters at one layer into a single neuron in the next layer. Also as shown, model 602b may comprise fully connected layers that connect every neuron in one layer to every neuron in another layer.

Figure 7:
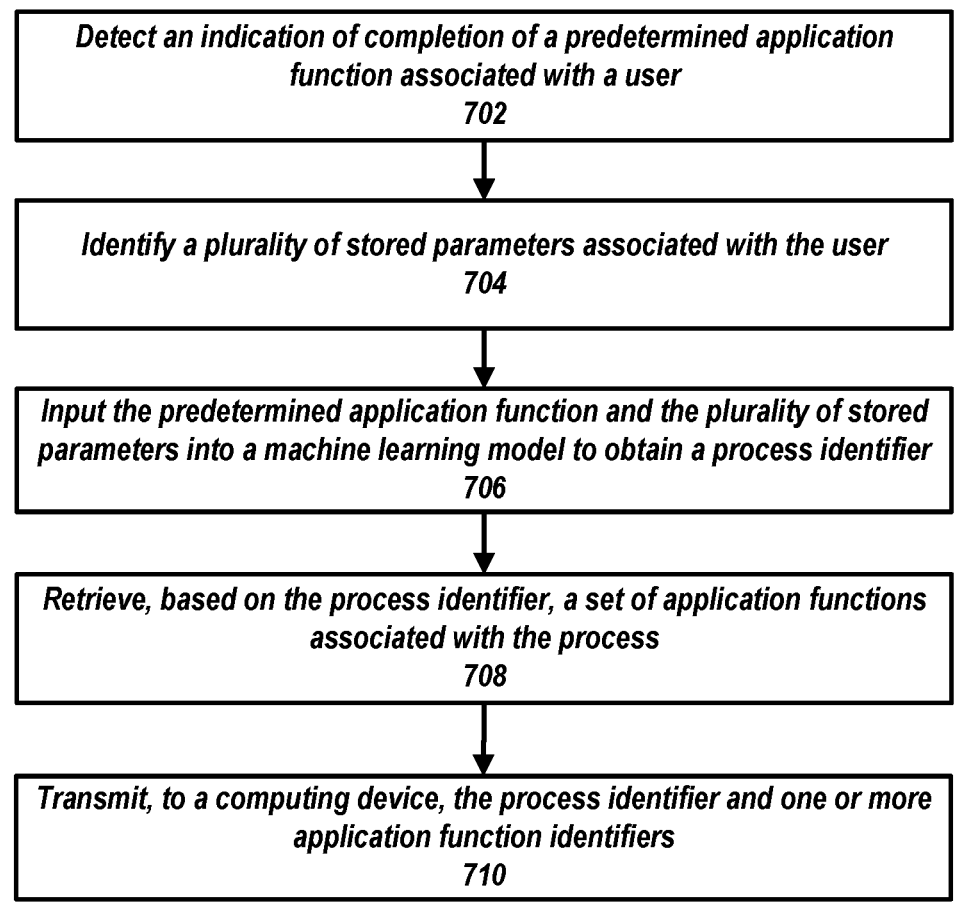
FIG. 7 shows a flowchart of the operations for predicting, using machine learning models, a process for a user based on function execution, in accordance with one or more embodiments.

FIG. 7 shows a flowchart of operations for predicting, using machine learning models, a process for a user based on function execution. For example, the system may use process 700 (e.g., as implemented on one or more system components described above (e.g., in FIGS. 1 and 6)) in order to predict, using machine learning models, a process for a user based on function execution. The operations described above may be performed on a user device (e.g., mobile device 622 or mobile device 624), in a cloud system, or using a combination of both. Thus, some operations may be performed on a user device and some operations may be performed in the cloud. Mobile device 622 and/or mobile device 624 may be user devices associated with users (e.g., smartphones, electronic tablets, etc.).

At 702, process prediction system 102 detects an indication of completion of a predetermined application function. For example, process prediction system 102 may receive an indication of a function being executed from mobile device 622, mobile device 624, or one of cloud components 610 and determine that the received function is a predetermined function. In some embodiments, the detection may be performed by the combination of cloud components 610 and a mobile device 622 or mobile device 624.

At 704, process prediction system 102 identifies a plurality of stored parameters associated with the user. For example, process prediction system 102 may reside on a user device and may perform the identification on a user device. In some embodiments, process prediction system 102 may reside in the cloud and may perform the identification within the cloud (e.g., on one of cloud components 610).

At 706, process prediction system 102 inputs the predetermined application function and the plurality of stored parameters into a machine learning model to obtain a process identifier. For example, process prediction system 102 may input the predetermined application function and the plurality of stored parameters into model 602b. The input may be input 604b while the output may be output 606b.

At 708, process prediction system 102 retrieves, based on the process identifier, a set of application functions associated with the process. For example, process prediction system 102 may perform the retrieval operation on mobile device 622, mobile device 624, or one of cloud components 610. For example, process prediction system 102 may reside on a user device and may perform the retrieval operation on the user device. Process prediction system 102 may perform the retrieval operation on one of cloud components 610, for example, when the machine learning model resides in the cloud. In some embodiments, process prediction system 102 may use an API call for retrieval.

At 710, process prediction system 102 transmits, to a computing device, the process identifier and one or more application function identifiers. For example, process prediction system 102 may send the command to mobile device 622 or mobile device 624 from one of cloud components 610. For example, process prediction system 102 may reside on one of the cloud components and send the command from that cloud component.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: detecting an indication of completion of a predetermined application function, wherein the predetermined application function is associated with a user; identifying a plurality of stored parameters associated with the user; inputting the predetermined application function and the plurality of stored parameters into a machine learning model to obtain a process identifier for a process that the user is predicted to complete, wherein the machine learning model has been trained to predict one or more processes based on predetermined application functions and the plurality of stored parameters; retrieving, based on the process identifier, a set of application functions associated with the process; and transmitting, to a computing device, the process identifier and one or more application function identifiers for one or more application functions of the set of application functions.

2. The method of any one of the preceding embodiments, further comprising generating a customized user interface based on the set of application functions, wherein the customized user interface indicates, to the user, the process to perform and the one or more application functions within the set of application functions to perform.

3. The method of any one of the preceding embodiments, wherein generating the customized user interface comprises: selecting, for the set of application functions, a set of interface elements; and inputting the set of interface elements into an interface generation model to obtain the customized user interface, wherein the interface generation model is trained to generate customized user interfaces based on element sets.

4. The method of any one of the preceding embodiments, further comprising: determining that the predetermined application function was performed for the user by a third party; transmitting to a device associated with the user a permissions request for the third party to perform the set of application functions; in response to receiving permission, from the user, to perform the set of application functions by the third party, generating a customized user interface on the computing device of the third party for performing the set of application functions; and transmitting a notification to a client device indicating that the third party is performing one or more functions of the set of application functions.

5. The method of any one of the preceding embodiments, further comprising: identifying, based on the process, one or more additional functions that are related to the process, wherein the one or more additional functions improve function execution; and generating one or more indications of the one or more additional functions.

6. The method of any one of the preceding embodiments, further comprising: receiving a training dataset comprising a plurality of entries and a plurality of features, wherein the training dataset comprises user history related to function execution, and wherein a target training feature indicates a corresponding process followed by the user; and inputting the training dataset into a training routine of the machine learning model to train the machine learning model based on the training dataset.

7. The method of any one of the preceding embodiments, wherein the training dataset comprises demographic data associated with each entry, and wherein the machine learning model is trained using both the user history related to the function execution and the demographic data of each corresponding user.

8. The method of any one of the preceding embodiments, further comprising: retrieving the user history for each user associated with the training dataset; identifying, for each user and based on function history and order of completion, corresponding one or more processes performed by each user; and updating the training dataset with the corresponding one or more processes as a target feature for training the machine learning model.

9. The method of any one of the preceding embodiments, further comprising: determining a device type associated with a client device which executed the predetermined application function; and inputting the device type into the machine learning model for obtaining the process identifier.

10. The method of any one of the preceding embodiments, further comprising: determining an order of associated with the set of application functions, wherein the order comprises two or more application functions that are enabled to be executed in parallel; and generating a plurality of user interface display tiles of different sizes based on the order of processes, wherein two or more tiles associated with the two or more application functions that are enabled to be executed in parallel are displayed in a same size.

11. The method of any one of the preceding embodiments, wherein detecting the indication of completion of the predetermined application function comprises: receiving the indication of completion from a third party, wherein the indication comprises an identifier associated with the user and a party identifier associated with the third party; and updating a record associated with the user with the set of application functions, wherein the record is associated with a permission to be accessed by the third party.

12. The method of any one of the preceding embodiments, further comprising: receiving from the machine learning model a plurality of process identifiers for a plurality of processes that the user is predicted to complete; identifying, for the plurality of processes, one or more non-common functions; generating for display, for each process of the plurality of processes, a plurality of selectable indications each associated with a corresponding non-common function; and training the machine learning model based on a selection of a non-common function.

13. A tangible, non-transitory, computer-readable medium storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for providing user interfaces using artificial intelligence, the system comprising:

one or more processors; and one or more memories configured to store instructions that when executed by the one or more processors perform operations comprising:

receiving, at a server from a client device, user interaction data as a user interacts with an application on the client device;

detecting, within the user interaction data received from the client device, an indication of completion of an initial predetermined application function of a set of application functions on the client device;

identifying a plurality of stored parameters associated with the user;

in response to the server detecting the indication of completion of the initial predetermined application function on the client device, inputting the initial predetermined application function and the plurality of stored parameters into a machine learning model to obtain a process identifier for identifying a predicted process that the user is predicted to complete, wherein the predicted process is one of a set of processes, wherein the machine learning model has been trained to predict one or more processes based on predetermined application functions and the plurality of stored parameters, and wherein the predicted process utilizes the initial predetermined application function and a plurality of other application functions;

retrieving, by the server, based on the process identifier, a set of predetermined application functions associated with the predicted process;

generating one or more commands for a customized user interface based on the set of predetermined application functions, wherein the customized user interface indicates, to the user, the predicted process to perform and one or more application functions within the set of predetermined application functions to perform;

transmitting, to the client device, a request to update a current user interface with the customized user interface, wherein the request comprises the process identifier and one or more application function identifiers for the one or more application functions;

determining a required order of execution for at least two of the set of predetermined application functions, wherein the required order indicates that a first application function must be completed prior to initiation of a second application function; and generating a plurality of user interface display tiles of different sizes, wherein the different sizes are based on the required order.

2. A method for predicting functions using artificial intelligence, the method comprising:

detecting, by a server, an indication of completion of an initial predetermined application function of a set of application functions on a client device, wherein the initial predetermined application function is associated with a user;

identifying a plurality of stored parameters associated with the user;

in response to the server detecting the indication of completion of the initial predetermined application function on the client device, inputting the initial predetermined application function and the plurality of stored parameters into a machine learning model to obtain a process identifier for identifying a predicted process that the user is predicted to complete, wherein the predicted process is one of a set of processes, wherein the machine learning model has been trained to predict one or more processes based on predetermined application functions and the plurality of stored parameters, and wherein the predicted process utilizes the initial predetermined application function and a plurality of other application functions;

retrieving, by the server, based on the process identifier, a set of predetermined application functions associated with the predicted process;

transmitting, to a computing device, the process identifier and one or more application function identifiers for one or more application functions of the set of predetermined application functions;

determining a required order of execution for at least two of the set of predetermined application functions, wherein the required order indicates that a first application function must be completed prior to initiation of a second application function; and generating a plurality of user interface display tiles of different sizes, wherein the different sizes are based on the required order.

3. The method of claim 2, further comprising generating a customized user interface based on the set of predetermined application functions, wherein the customized user interface indicates, to the user, the predicted process to perform and the one or more application functions within the set of predetermined application functions to perform.

4. The method of claim 3, wherein generating the customized user interface comprises:

selecting, for the set of predetermined application functions, a set of interface elements; and inputting the set of interface elements into an interface generation model to obtain the customized user interface, wherein the interface generation model is trained to generate customized user interfaces based on element sets.

5. The method of claim 2, further comprising:

determining that the initial predetermined application function is performed for the user by a third party on the computing device;

transmitting to a device associated with the user a permissions request for the third party to perform the set of predetermined application functions;

in response to receiving permission, from the user, for the third party to perform the set of predetermined application functions, generating one or more instructions for a customized user interface on the computing device of the third party for performing the set of predetermined application functions; and transmitting a notification to the client device indicating that the third party is performing one or more functions of the set of predetermined application functions.

6. The method of claim 2, further comprising:
identifying, based on the predicted process, one or more additional functions that are related to the predicted process; and
generating one or more indications of the one or more additional functions.

7. The method of claim 2, further comprising:
receiving a training dataset comprising a plurality of entries and a plurality of features, wherein the training dataset comprises user history related to function execution, and wherein a target training feature indicates a corresponding process followed by the user; and
inputting the training dataset into a training routine of the machine learning model to train the machine learning model based on the training dataset.

8. The method of claim 7, wherein the training dataset comprises demographic data associated with each entry, and wherein the machine learning model is trained using both the user history related to the function execution and the demographic data of each corresponding user.

9. The method of claim 7, further comprising:
retrieving the user history for each user associated with the training dataset;
identifying, for each user and based on function history and order of completion, corresponding one or more processes performed by each user; and
updating the training dataset with the corresponding one or more processes as a target feature for training the machine learning model.

10. The method of claim 2, further comprising:
determining a device type associated with the client device which executed the initial predetermined application function; and
inputting the device type into the machine learning model for obtaining the process identifier.

11. The method of claim 2, further comprising:
determining an order of processes associated with the set of predetermined application functions, wherein the order comprises two or more application functions that are enabled to be executed in parallel; and
generating a plurality of user interface display tiles of different sizes based on the order of processes, wherein two or more tiles associated with the two or more application functions that are enabled to be executed in parallel are displayed in a same size.

12. The method of claim 2, wherein detecting the indication of completion of the initial predetermined application function comprises:
receiving the indication of completion from a third party, wherein the indication comprises an identifier associated with the user and a party identifier associated with the third party; and
updating a record associated with the user with the set of predetermined application functions, wherein the record is associated with a permission to be accessed by the third party.

13. The method of claim 2, further comprising:
receiving from the machine learning model a plurality of process identifiers for a plurality of processes that the user is predicted to complete;
identifying, for the plurality of processes, one or more non-common functions;
generating for display, for each process of the plurality of processes, a plurality of selectable indications each associated with a corresponding non-common function; and
training the machine learning model based on a selection of a non-common function.

14. One or more non-transitory, computer-readable media for providing user interfaces using artificial intelligence, storing instructions thereon that cause one or more processors to perform operations comprising:
detecting, by a server, an indication of completion of initial predetermined application function of a set of application functions on a client device, wherein the initial predetermined application function is associated with a user;
identifying a plurality of stored parameters associated with the user;
in response to the server detecting the indication of completion of the initial predetermined application function on the client device, inputting the initial predetermined application function and the plurality of stored parameters into a machine learning model to obtain a process identifier for identifying a predicted process that the user is predicted to complete, wherein the predicted process is one of a set of processes, wherein the machine learning model has been trained to predict one or more processes based on predetermined application functions and the plurality of stored parameters, and wherein the predicted process utilizes the initial predetermined application function and a plurality of other application functions;
retrieving, by the server, based on the process identifier, a set of predetermined application functions associated with the predicted process;
transmitting, to a computing device, the process identifier and one or more application function identifiers for one or more application functions of the set of predetermined application functions;
determining a required order of execution for at least two of the set of predetermined application functions, wherein the required order indicates that a first application function must be completed prior to initiation of a second application function; and
generating a plurality of user interface display tiles of different sizes, wherein the different sizes are based on the required order.

15. The one or more non-transitory, computer-readable media of claim 14, wherein the instructions further cause the one or more processors to generate a customized user interface based on the set of predetermined application functions, wherein the customized user interface indicates, to the user, the predicted process to perform and the one or more application functions within the set of predetermined application functions to perform.

16. The one or more non-transitory, computer-readable media of claim 15, wherein the instructions for generating the customized user interface further cause the one or more processors to perform operations comprising:
selecting, for the set of predetermined application functions, a set of interface elements; and
inputting the set of interface elements into an interface generation model to obtain the customized user interface, wherein the interface generation model is trained to generate customized user interfaces based on element sets.

17. The one or more non-transitory, computer-readable media of claim 14, wherein the instructions further cause the one or more processors to perform operations comprising:
determining that the initial predetermined application function is performed for the user by a third party;

transmitting to a device associated with the user a permissions request for the third party to perform the set of predetermined application functions;

in response to receiving permission, from the user, for the third party to perform the set of predetermined application functions, generating a customized user interface on the computing device of the third party for performing the set of predetermined application functions; and transmitting a notification to the client device indicating that the third party is performing one or more functions of the set of predetermined application functions.

18. The one or more non-transitory, computer-readable media of claim 14, wherein the instructions further cause the one or more processors to perform operations comprising:

identifying, based on the predicted process, one or more additional functions that are related to the predicted process; and generating one or more indications of the one or more additional functions.

19. The one or more non-transitory, computer-readable media of claim 14, wherein the instructions further cause the one or more processors to perform operations comprising:

receiving a training dataset comprising a plurality of entries and a plurality of features, wherein the training dataset comprises user history related to function execution, and wherein a target training feature indicates a corresponding process followed by the user; and inputting the training dataset into a training routine of the machine learning model to train the machine learning model based on the training dataset.

\* \* \* \* \*